(12) United States Patent
Barel et al.

(10) Patent No.: US 12,229,378 B1
(45) Date of Patent: Feb. 18, 2025

(54) KEYBOARD WITH FORCE-SENSING TRACKPAD

(71) Applicant: Microsoft Technology Licensing, LLC, Redmond, WA (US)

(72) Inventors: Eliyahu Barel, Rosh-HaAyin (IL); Ahia Peretz, Elkana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/414,111

(22) Filed: Jan. 16, 2024

(51) Int. Cl.
G06F 3/044 (2006.01)
G06F 3/01 (2006.01)
G06F 3/0354 (2013.01)

(52) U.S. Cl.
CPC ............ G06F 3/0447 (2019.05); G06F 3/016 (2013.01); G06F 3/03547 (2013.01)

(58) Field of Classification Search
CPC .......... G06F 3/016; G06F 3/041; G06F 3/044; G06F 3/0447; G06F 3/0448; G06F 3/03547; G06F 2203/04105
USPC ......................................................... 345/157
See application file for complete search history.

(56) References Cited

U.S. PATENT DOCUMENTS

| | | | |
|---|---|---|---|
| 9,182,820 B1 | 11/2015 | Hebenstreit | |
| 10,496,211 B1* | 12/2019 | Smith | ........................ G01L 1/26 |
| 10,509,471 B2 | 12/2019 | Dabic | |
| 11,726,597 B1* | 8/2023 | Peretz | .................... G06F 3/0443 |
| | | | 345/173 |
| 11,768,542 B1* | 9/2023 | Dani | ...................... G06F 3/0416 |
| | | | 345/174 |
| 2011/0012717 A1 | 1/2011 | Pance | |
| 2011/0148607 A1 | 6/2011 | Zeleny | |
| 2012/0068957 A1 | 3/2012 | Puskarich | |
| 2012/0327025 A1 | 12/2012 | Huska | |
| 2013/0215079 A1 | 8/2013 | Johnson | |
| 2013/0241718 A1 | 9/2013 | Wang | |
| 2016/0202760 A1 | 7/2016 | Churikov | |
| 2016/0216842 A1* | 7/2016 | Mölne | ..................... G06F 3/044 |
| 2017/0285748 A1 | 10/2017 | Evans, V | |
| 2018/0039331 A1 | 2/2018 | Warren | |
| 2018/0081441 A1* | 3/2018 | Pedder | ................ G06F 3/03547 |
| 2020/0213768 A1 | 7/2020 | Lee | |
| 2020/0341584 A1 | 10/2020 | Wang | |
| 2022/0214751 A1 | 7/2022 | Miller | |
| 2022/0221936 A1 | 7/2022 | Park | |
| 2022/0221938 A1 | 7/2022 | Chen | |
| 2022/0283641 A1 | 9/2022 | Chen | |
| 2022/0297354 A1 | 9/2022 | Davila-Peralta | |
| 2022/0391016 A1 | 12/2022 | Cody | |

(Continued)

Primary Examiner — Tom V Sheng
(74) Attorney, Agent, or Firm — Alleman Hall & Tuttle LLP

(57) ABSTRACT

Keyboard and trackpad configurations and related methods utilize data from one or more bending sensors to determine a force applied to the touch receiving surface. In one example, a method for determining a force applied to a touch receiving surface of a force-sensing trackpad in a keyboard includes using at least data from a bending sensor to determine that the keyboard is bending. At least on condition of determining that the keyboard is bending, the method includes adjusting a spring constant value to an adjusted spring constant value, and using the adjusted spring constant value to determine the force applied to the touch receiving surface.

20 Claims, 10 Drawing Sheets

(56) References Cited

U.S. PATENT DOCUMENTS

| | | | |
|---|---|---|---|
| 2023/0110133 A1* | 4/2023 | Dhar | G06F 3/045 345/173 |
| 2023/0126612 A1 | 4/2023 | Gajiwala | |
| 2023/0266829 A1* | 8/2023 | Sathe | G06F 3/03547 345/168 |
| 2023/0305637 A1* | 9/2023 | Rosenberg | H01H 13/85 |
| 2023/0315214 A1* | 10/2023 | Lochun | H01H 13/85 345/168 |

\* cited by examiner

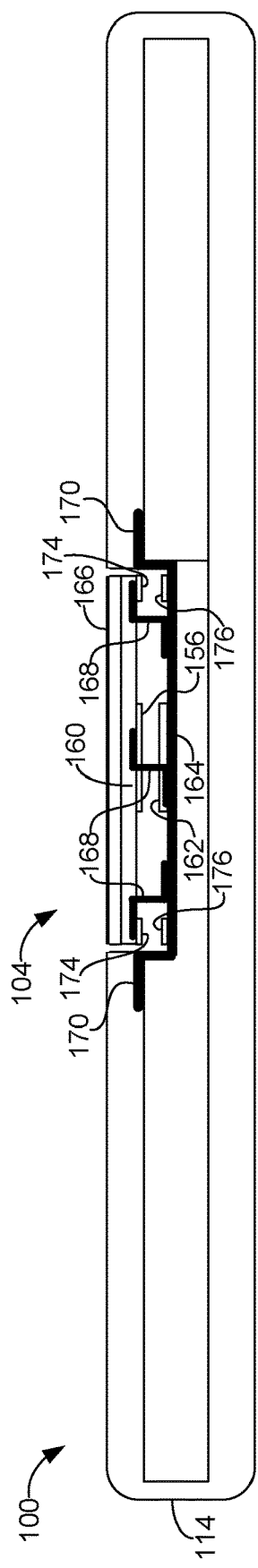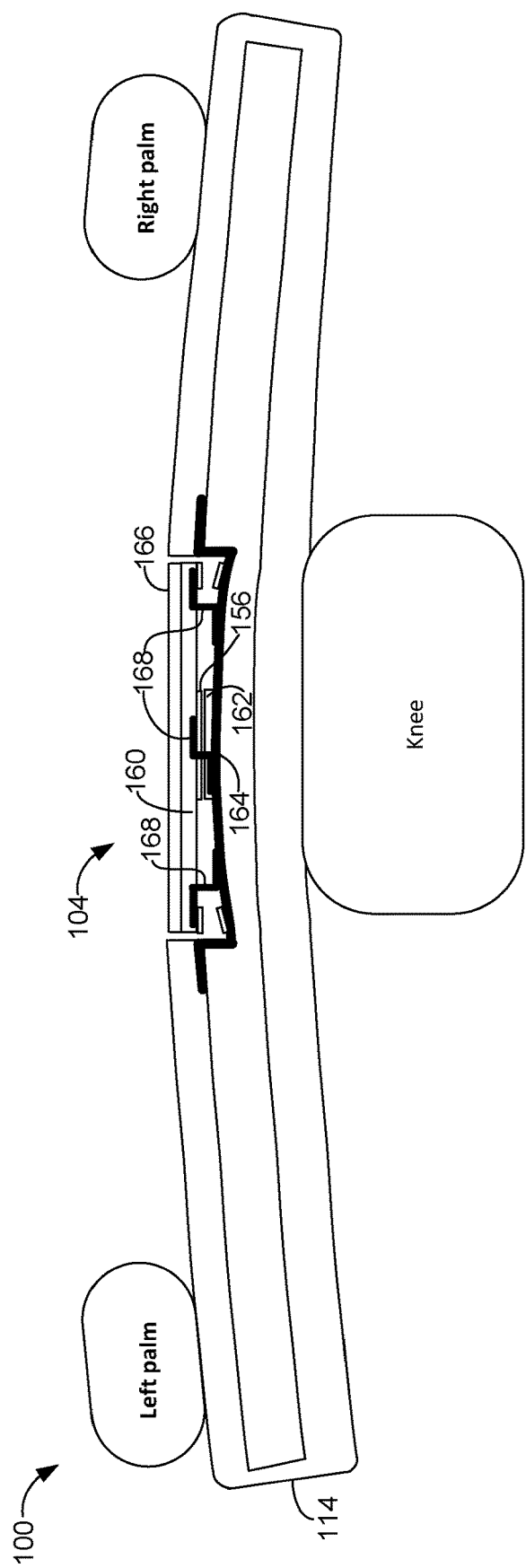
FIG. 3
FIG. 4

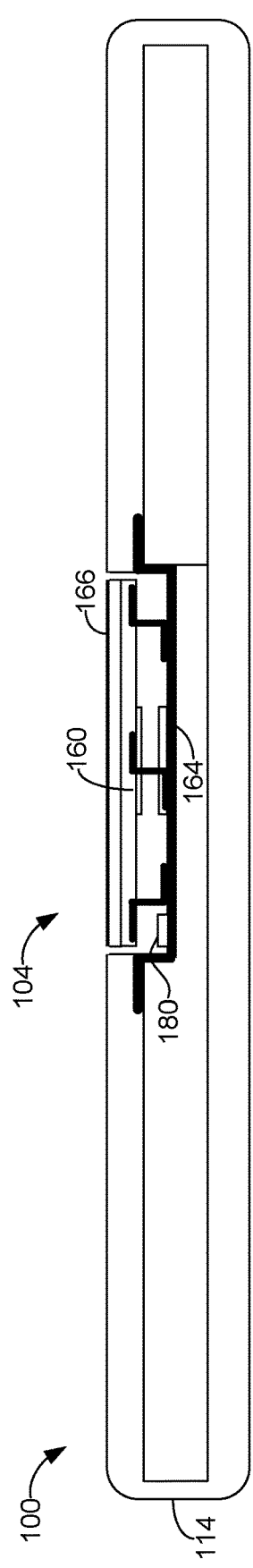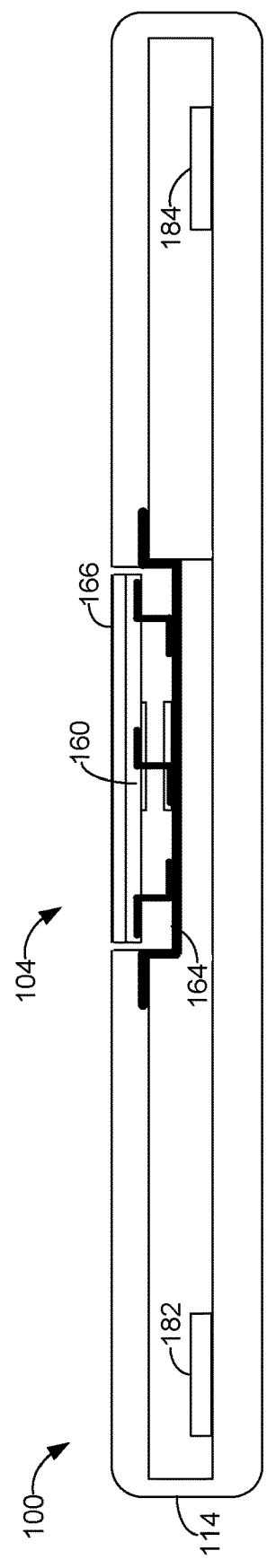

(10A)

↓

Wherein the spring constant value is a first spring constant value associated with a first location on the touch receiving surface, the adjusted spring constant value is a first adjusted spring constant value, and the force is a first force applied at the first location on the touch receiving surface:

> At least on condition of determining that the keyboard is bending, adjusting a second spring constant value associated with a second location on the touch receiving surface to a second adjusted spring constant value 340
>
> Using the second adjusted spring constant value to determine a second force applied at the second location on the touch receiving surface 344

↓

Wherein the PCB comprises a plurality of PCB electrodes, the base plate comprises a plurality of base electrodes, and the bending sensor comprises the PCB electrodes and the base electrodes 348

↓

Determining that the keyboard is bending at least by detecting capacitance changes between the PCB electrodes and the base plate electrodes. 352

↓

Wherein the force-sensing trackpad comprises a haptic actuator coupled to the touch receiving surface:

> determining that the force exceeds a force-to-fire threshold 356
>
> Based at least on determining that the force exceeds the force-to-fire threshold, causing the haptic actuator to generate haptic output via the touch receiving surface 360

FIG. 10B

KEYBOARD WITH FORCE-SENSING TRACKPAD

BACKGROUND

Some keyboards include a force-sensing trackpad. Keyboard bending and component wear over time can affect force-sensing components and their operation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating keyboards, force-sensing trackpad configurations and related methods that utilize data from one or more bending sensors to determine a force applied to a touch receiving surface of the trackpad. In one example, a keyboard comprises a force-sensing trackpad comprising a touch receiving surface and a printed circuit board (PCB) coupled to the touch receiving surface. A base plate is spaced from the PCB, and a plurality of resilient members couple the base plate to the PCB. A bending sensor is configured to detect bending of the keyboard.

A memory stores instructions executable by a processor to use at least data from the bending sensor to determine that the keyboard is bending. At least on condition of determining that the keyboard is bending, a spring constant value is adjusted to an adjusted spring constant value. The adjusted spring constant value is then used to determine a force applied to the touch receiving surface.

In another example, a method for determining a force applied to a touch receiving surface of a force-sensing trackpad in a keyboard includes using at least data from a bending sensor to determine that the keyboard is bending. At least on condition of determining that the keyboard is bending, the method includes adjusting a spring constant value to an adjusted spring constant value, and using the adjusted spring constant value to determine the force applied to the touch receiving surface.

In another example, a keyboard comprises a force-sensing haptic trackpad comprising a touch receiving surface, a haptic actuator coupled to the touch receiving surface, and a printed circuit board (PCB) coupled to the touch receiving surface and comprising PCB electrodes. A base plate is spaced from the PCB and comprises base electrodes, and a plurality of resilient members couple the base plate to the PCB.

A memory stores instructions executable by a processor to use at least capacitance change data from the PCB electrodes and the base electrodes to determine that the keyboard is bending. At least on condition of determining that the keyboard is bending, the capacitance change data is used to determine an adjusted spring constant value. The adjusted spring constant value is used to determine a force applied to the touch receiving surface. The method determines that the force exceeds a force-to-fire threshold. Based at least on determining that the force exceeds the force-to-fire threshold, the haptic actuator is caused to generate haptic output via the touch receiving surface.

BRIEF DESCRIPTION OF THE DRAWINGS

FIG. 3 shows a partial cross-section view of one example of the keyboard of FIG. 1.

FIG. 4 shows the keyboard of FIG. 3 in a bending use case.

FIG. 8 shows a partial cross-section view of another configuration of the keyboard of FIG. 1 according to examples of the present disclosure.

FIG. 9 shows a partial cross-section view of another configuration of the keyboard of FIG. 1 according to examples of the present disclosure.

FIGS. 10A and 10B show a flow diagram of an example method for determining a force applied to a touch receiving surface of a force-sensing trackpad in a keyboard according to examples of the present disclosure.

DETAILED DESCRIPTION

Figure 1:
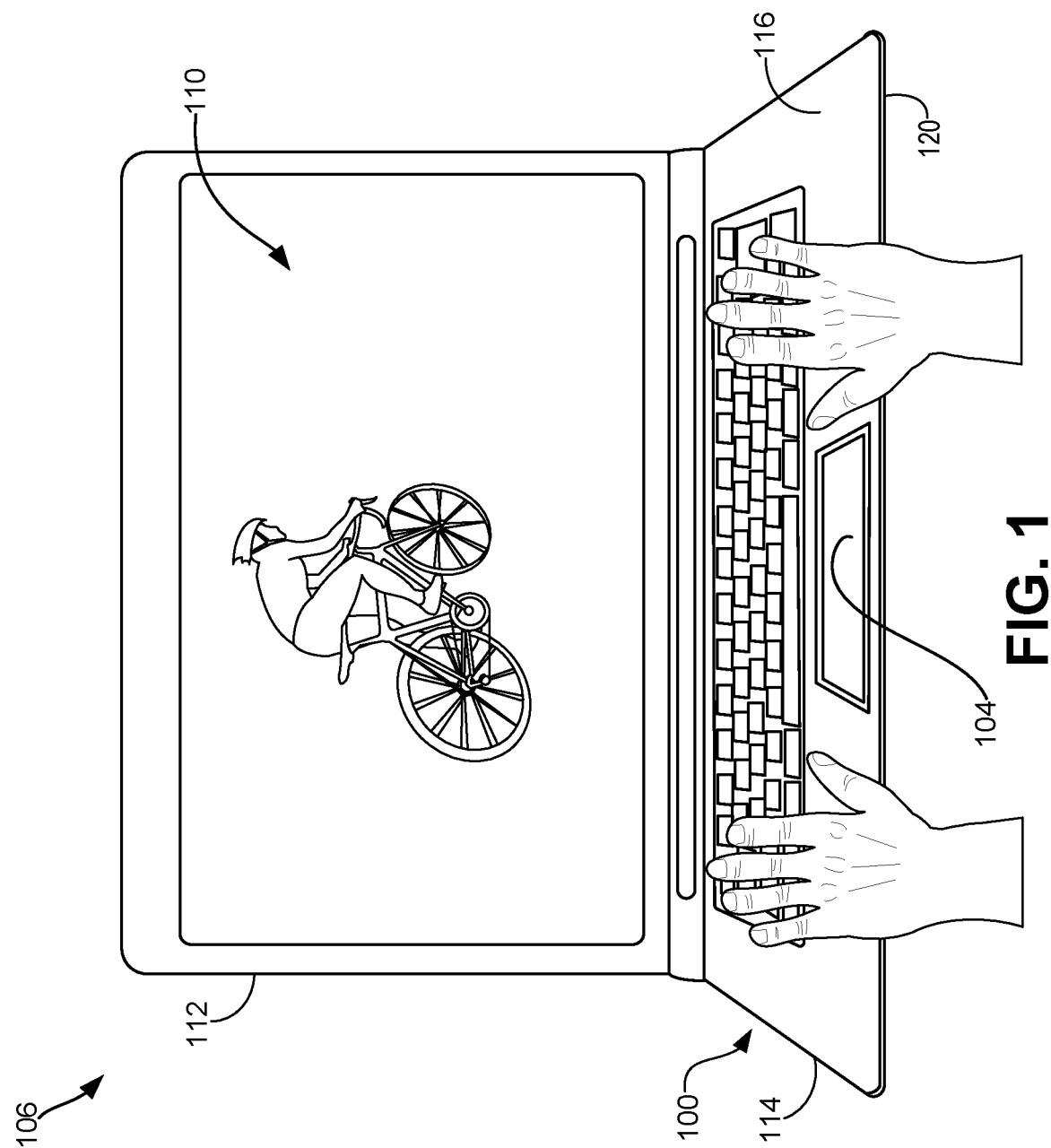
FIG. 1 shows one example of a computing device utilizing a keyboard and force-sensing trackpad according to examples of the present disclosure.

Some computing devices include or are otherwise communicatively coupled to a keyboard with a force-sensing trackpad for receiving user inputs. In some examples when a user contacts the force-sensing trackpad and exerts a force that exceeds a predetermined threshold, such as a "force-to-fire" threshold, a user input is recognized by the computing device and a corresponding action is performed. In some of these keyboards, the trackpad is coupled to one or more haptic components that are configured to generate vibrations in the trackpad. For example, in some devices one or more conductive coils, linear resonant actuators (LRAs), or other haptic components are coupled to the trackpad and configured to vibrate the trackpad to provide haptic feedback to a user. In these keyboards, when a user input is determined to exceed a force-to-fire threshold, the haptic components can generate haptic feedback in the trackpad to alert the user that their input is received.

Force-sensing trackpads can utilize a variety of different components and/or techniques for generating data that can be used to determine a magnitude of force that is exerted on the trackpad from a user contact(s). In some examples and as described further below, trackpads can utilize capacitance measurements from opposing electrodes to estimate a force applied to the trackpad. In other examples, other configurations and components, such as piezoresistive materials, can be utilized to estimate the force exerted from a user contact(s).

Some keyboards utilize a thin form factor and lightweight materials that reduce available packaging space and can limit structural integrity. In such flexible keyboards that include a force-sensing trackpad, certain use cases can cause bending of the keyboard and generate internal forces that affect the accuracy of force measurements determined from one or more force sensors in the trackpad. Examples can include two or more fingers pressing with significant force on the trackpad, a palm resting on the trackpad, and a user resting the keyboard on one leg and placing both palms on opposite sides of the keyboard to induce bending in the keyboard. In these different user scenarios, inconsistent force calculations caused by keyboard bending can result in less than satisfactory user experiences. Additionally, in some cases as a keyboard is used over time, repeated bending of the keyboard can cause deformations, warpage, mechanical stress residues, and/or other mechanical changes to components that can also negatively affect force calculations.

Accordingly, in one potential advantage of the present disclosure and as described in more detail below, configurations of the present disclosure provide keyboard and trackpad configurations and related methods that utilize data from one or more bending sensors to determine a force applied to a touch receiving surface of the trackpad. As described in more detail below, keyboards of the present disclosure utilize a bending sensor to determine that the keyboard is bending. Data from the bending sensor is used to adjust a spring constant value to an adjusted spring constant value, and the adjusted spring constant value is used to determine a force applied to the touch receiving surface. Accordingly, and in one potential advantage of the present disclosure, calculations of forces applied to the touch receiving surface are adjusted to account for deformations of the keyboard, thereby providing more consistent user experiences over a variety of use case scenarios.

Figure 2:
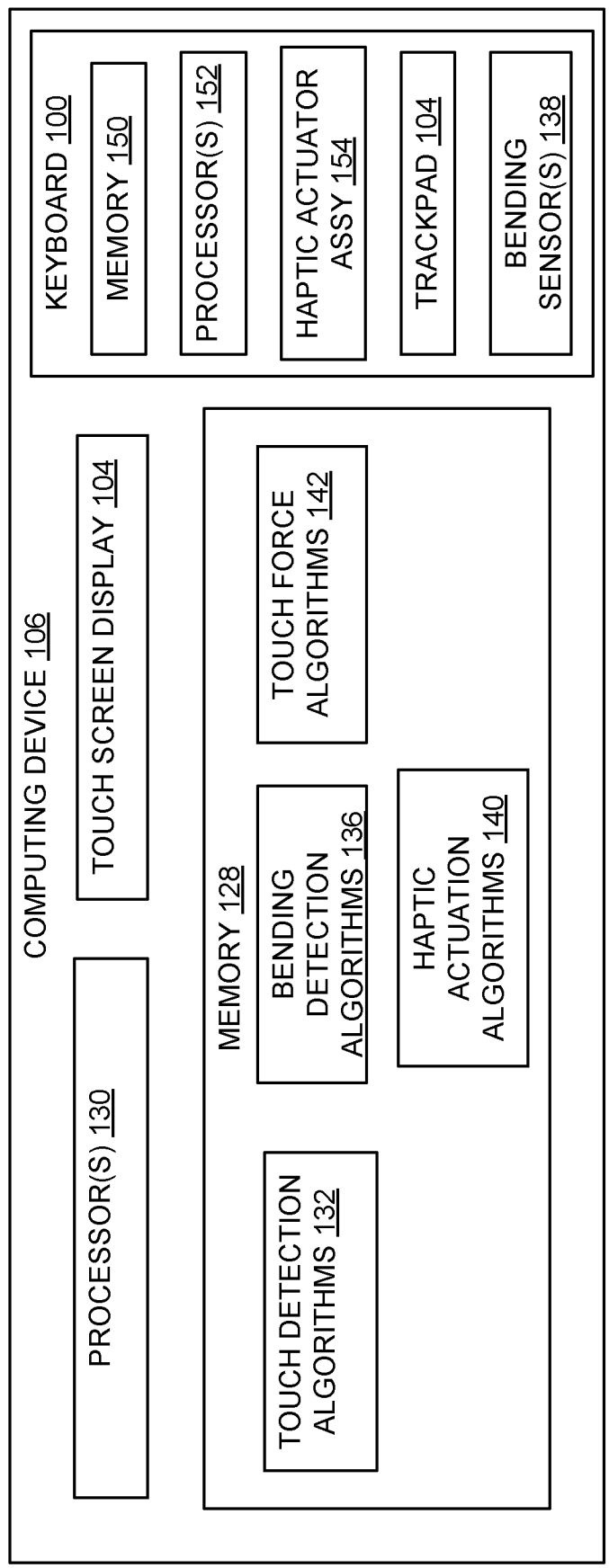
FIG. 2 shows a schematic view of components of the computing device and keyboard of FIG. 1 according to examples of the present disclosure.

With reference now to FIGS. 1 and 2, an example of a keyboard 100 with a force-sensing trackpad 104 and associated computing device 106 in the form of a laptop computer is illustrated. In this example computing device 106 includes a touch screen display 110 on a display substrate 112 that is rotatably coupled to a chassis 114 of the keyboard 100. Chassis 114 includes a user interaction surface 116 that comprises the trackpad 104, keys of the keyboard 100, and an opposing rear cover 120. In different examples a user provides touch inputs to the trackpad 104 by touching the trackpad with one or more digits or other portions of the user's hand(s).

In some examples, keyboard 100 is detachable from display substrate 112 to enable the user to use the keyboard in various positions separated from the touch screen display 110. In some examples, keyboards of the present disclosure can be utilized with and/or implemented in a variety of computing devices, such as desktop computing devices, tablet computing devices, foldable computing devices including multiple touch screens, wearable and other mobile computing devices.

Trackpad 104 is configured to detect the position and force of a user's finger(s), thumb, or other body part contacting the trackpad. In some examples the trackpad 104 is a mutual capacitance trackpad. In these examples, touch inputs are identified by sampling capacitance between a driving electrode and a sensing electrode in an upper layer of the trackpad. Driving electrodes are arranged in an array within trackpad 104. Touch detection signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode. In other examples and as described further below, trackpads employing other touch detection technologies, including but not limited to differential capacitance, self-capacitance, and projected capacitance touch detection, can be utilized.

With reference now to FIG. 2, a schematic view of selected components of the example computing device 106 and keyboard 100 of FIG. 1 is provided. Computing device 106 includes memory 128 that stores instructions executable by one or more processors 130. For example, the memory 128 stores instructions in the form of touch detection algorithms 132 executable by processor(s) 130 to perform touch detection on the trackpad 104 using signals received from the trackpad.

As described in more detail below, memory 128 also stores instructions in the form of bending detection algorithms 136 executable by the processor 130 to determine that the keyboard is bending via data received from one or more bending sensors 138 in the keyboard 100. At least on condition of determining that the keyboard is bending, touch force algorithms 142 executable by the processor 130 adjust a spring constant value to an adjusted spring constant value to account for effects of the keyboard bending. The touch force algorithms 142 then utilize the adjusted spring constant value to determine the force applied to the touch receiving surface of the trackpad 104.

In this example, memory 128 also stores instructions in the form of haptic actuation algorithms 140 that are executable by processor 130 to control a haptic actuator assembly 154 coupled to the touch receiving surface of the trackpad 104. In other examples, keyboards of the present disclosure do not include haptic actuator assemblies or haptic actuation algorithms. As described in more detail below, in the present example the haptic actuation algorithms are configured to determine whether the force applied to the touch receiving surface of the trackpad 104 exceeds a force-to-fire threshold. When the algorithms determine that the force exceeds the force-to-fire threshold, the haptic actuator is caused to generate haptic output via the touch receiving surface of the trackpad 104. Additional details regarding memory 128, processor(s) 130, and other components and subsystems of computing device 106 are described further below with reference to FIG. 11.

As described in more detail below, keyboard 100 comprises haptic actuator assembly 154 that receives driver signals from the haptic actuation algorithms 140. In some examples, keyboard 100 includes memory 150 that stores instructions executable by a processor(s) 152 to perform keyboard-related and trackpad-related functions. In some examples, the instructions take the form of touch detection algorithms 132, bending detection algorithms 136, haptic actuation algorithms 140, and/or touch force algorithms 142 as described herein.

With reference now to FIGS. 3 and 4, schematic partial cross sections of one example of keyboard 100 that utilizes bending sensors in the form of capacitive electrodes are illustrated. In this example, chassis 114 is fabricated from one or more deformable materials, such as plastic, aluminum, magnesium, or other material having a measure of flexibility. In this example, the haptic actuator assembly 154 comprises a conductive coil 156 formed on or affixed to a printed circuit board (PCB) 160 of the trackpad 104, and at least one magnet 162 rigidly affixed to a base plate 164.

Conductive coil 156 and magnet 162 are configured to produce user-perceptible vibrations in the touch receiving surface of the trackpad.

As described further below, in this example trackpad 104 utilizes capacitance measurements to estimate a force applied to the trackpad and determine that the keyboard is bending. The trackpad 104 includes a touch receiving surface 166 that is coupled to the PCB 160. In some examples, the touch receiving surface 166 is a non-deformable touch receiving surface, such as a cover glass assembly. PCB 160 is supported by resilient members 168, such as springs, over base plate 164 that is connected to electrical ground. In this example the base plate 164 is coupled to the chassis 114 via base plate arms 170.

As described further below and with reference to FIG. 3, in this example the touch force algorithms 142 of the trackpad 104 utilize capacitance measurements from two PCB electrodes 174 affixed to the PCB 160 and two opposing base electrodes 176 affixed to the base plate 164 to determine a force applied to the touch receiving surface 166. In this example the bending detection algorithms 136 also utilize capacitance measurements from the PCB electrodes 174 and base electrodes 176 to determine keyboard bending.

The capacitance between a PCB electrode 174 and its opposing base electrode 176 on the grounded base plate 164 is a function of the distance between them. In these examples, a capacitive force transducer can utilize displacement as a proxy for force. In such a parallel plate capacitor model, the capacitance is equal to the area of the electrode divided by the distance between the electrode and the base plate 164. When a force applied to the cover glass assembly compresses the resilient members 168 and reduces this distance, the capacitance changes. In this model, the capacitance is directly proportional to the applied force.

In one example, where the area of an electrode is represented by $A_{pad}$, the initial distance between the electrode and the base plate 164 is do, and the change in the distance as a result of a force F applied by a user is d(F)=F/K, the capacitance as a result of the Force F is given by the equation:

$$\text{Capacitance (Force)} = \varepsilon \frac{A_{pad}}{d_0 - d(F)} = \varepsilon \frac{A_{pad}}{d_0 - \frac{F}{K}},$$

where K is the spring constant of the spring(s) (resilient members 168) between the PCB and the base plate 164, F is the force applied by the user on the trackpad, and ε is the permittivity of the medium in the gap between the electrode and the base plate 164. In this manner, a measured change in capacitance can be used to calculate the magnitude of the applied force F to the touch receiving surface 166.

In some examples, force-detecting trackpads are calibrated in the factory with a single system spring constant K, or individual fixed spring constants K for each pair of PCB and base electrodes. After production, these factory-calibrated spring constants K are utilized by force detecting algorithms to determine a force applied to the trackpad in all use case scenarios in the field.

However and as noted above, in some use cases the keyboard 104 can undergo bending or other mechanical deformations that can affect system and/or individual spring constants K, which in turn can negatively impact the accuracy of force measurements determined by the touch force algorithms 142. For example, over time some components of a keyboard can deform due to repeated use or damage, material and/or mechanical property changes can arise, and stress residues can accumulate.

In other examples the keyboard may deform during certain use cases. For example, and with reference to FIG. 4, in one example use case a user can support a middle section of the deformable keyboard chassis 114 on her knee while resting her left and right palms on either side of the keyboard. As shown in FIG. 4, these forces cooperate to bend the chassis 114 and components of the trackpad 104, such as the base plate 164. Such forces also stretch and compress the resilient members 168 by different amounts, which alters the elasticity and spring force K of the resilient members and imposes tensile and compressive forces and moments on the PCB 160 and touch receiving surface 166.

In some examples and configurations, bending the keyboard can also cause one or more components to contact the PCB 160, thereby creating a frictional contact that further changes the elasticity and spring force of the resilient members. With reference to the example configuration of FIG. 4, in some examples the magnet 162 can contact coil 156 on the PCB 160 and alter the spring force of the resilient members. In these and similar use case scenarios, it follows that force determinations that rely on a prior factory-determined spring constant K can generate inaccurate results and less than satisfactory user experiences.

Accordingly, to address these and other drawbacks of prior configurations, configurations of the present disclosure utilize data from one or more bending sensors to adjust a spring constant value to an adjusted spring constant value to accommodate for effects of keyboard bending. The adjusted spring constant value is then used to determine the force applied to the touch receiving surface. In this manner, and in one potential advantage of the present disclosure, the configurations disclosed herein provide more consistent and accurate force determinations across a variety of use cases and over the lifespan of the keyboard. Further, in trackpads that provide haptic feedback corresponding to user force inputs, the configurations disclosed herein provide users with more consistent and uniform haptic experiences regardless of keyboard deformations.

As described further below, in the present example keyboard 100 utilizes a bending sensor in the form of a plurality of sensing pads (capacitive electrodes) to determine that the keyboard is bending. At least on condition of determining that the keyboard is bending, a spring constant value is adjusted to an adjusted spring constant value and used to determine a force applied to the touch receiving surface.

In the configuration of FIGS. 3 and 4 the bending sensor(s) 138 comprise the PCB electrodes 174 and their corresponding base electrodes 176. In this manner, bending detection algorithms 136 can utilize data from the electrodes indicating a capacitance change between the PCB electrodes and the base electrodes to determine that keyboard 100 is bending. In this example and as described further below, using two PCB electrodes 174 and corresponding base electrodes 176 on opposing ends of the PCB 160 and base plate 164, respectively, provides capacitance data at multiple locations to allow for more precise determinations of keyboard bending behavior. In other examples, three or more pairs of PCB electrodes 174 and base electrodes 176 can be utilized. In another example, a single PCB electrode 174 and corresponding base electrode 176 can be utilized.

In different examples, the touch force algorithms 142 can employ a variety of techniques to utilize data from the electrodes to adjust a spring constant value to an adjusted spring constant value that is used to determine a force applied to the touch receiving surface. In some examples, capacitance changes detected at the PCB electrodes 174 can be utilized with a look up table to select an adjusted spring constant value corresponding to the capacitance change. In some examples, the touch force algorithms 142 can utilize machine learning algorithms to determine an adjusted spring constant value that corresponds to a particular capacitance change. In these examples, at least on condition of determining that the keyboard is bending, the spring constant value is adjusted to an adjusted spring constant value, which is then used to determine a force applied to the touch receiving surface.

Figure 5:
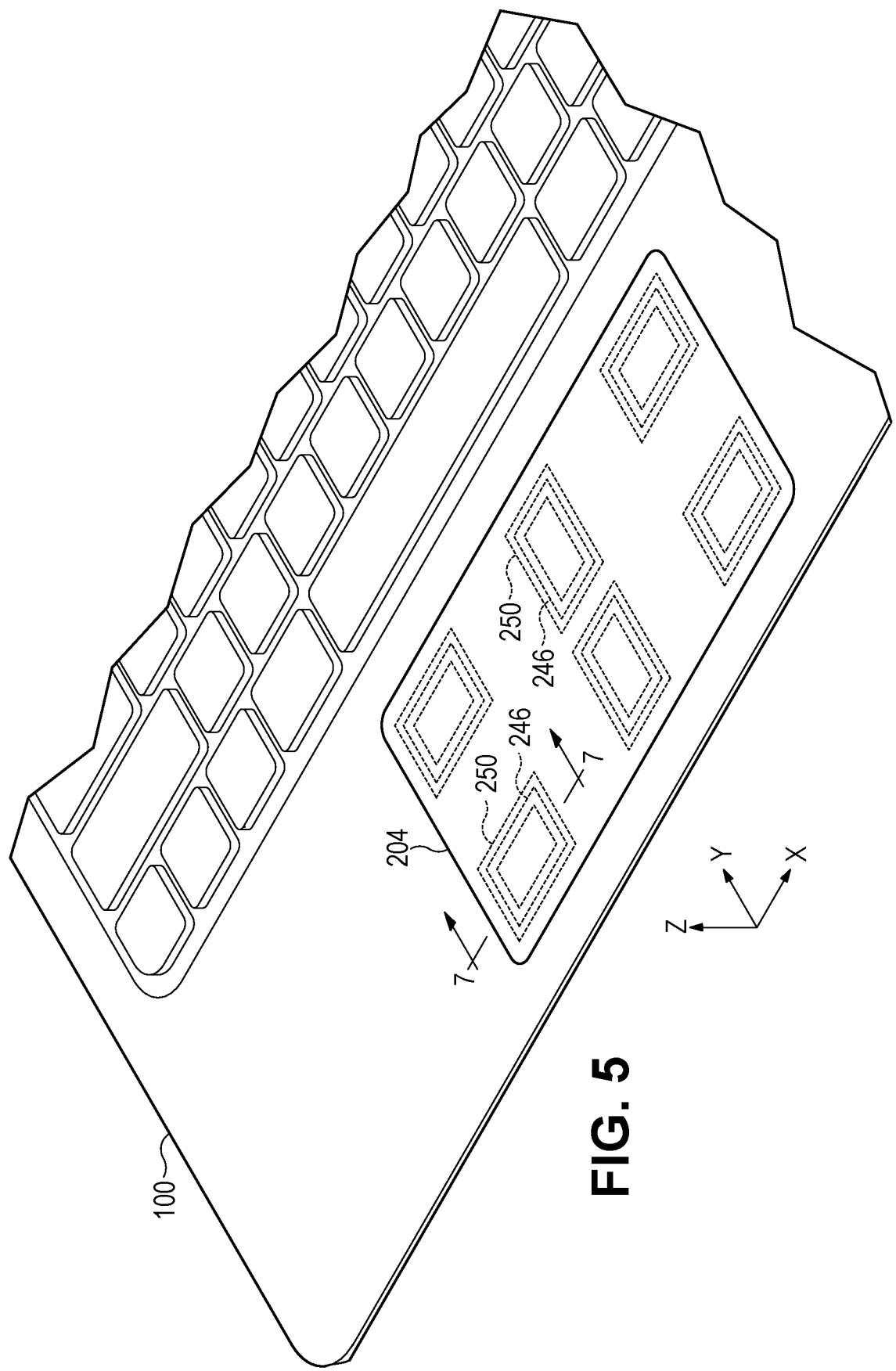
FIG. 5 shows a partial view of another example keyboard and trackpad according to examples of the present disclosure.
Figure 6:
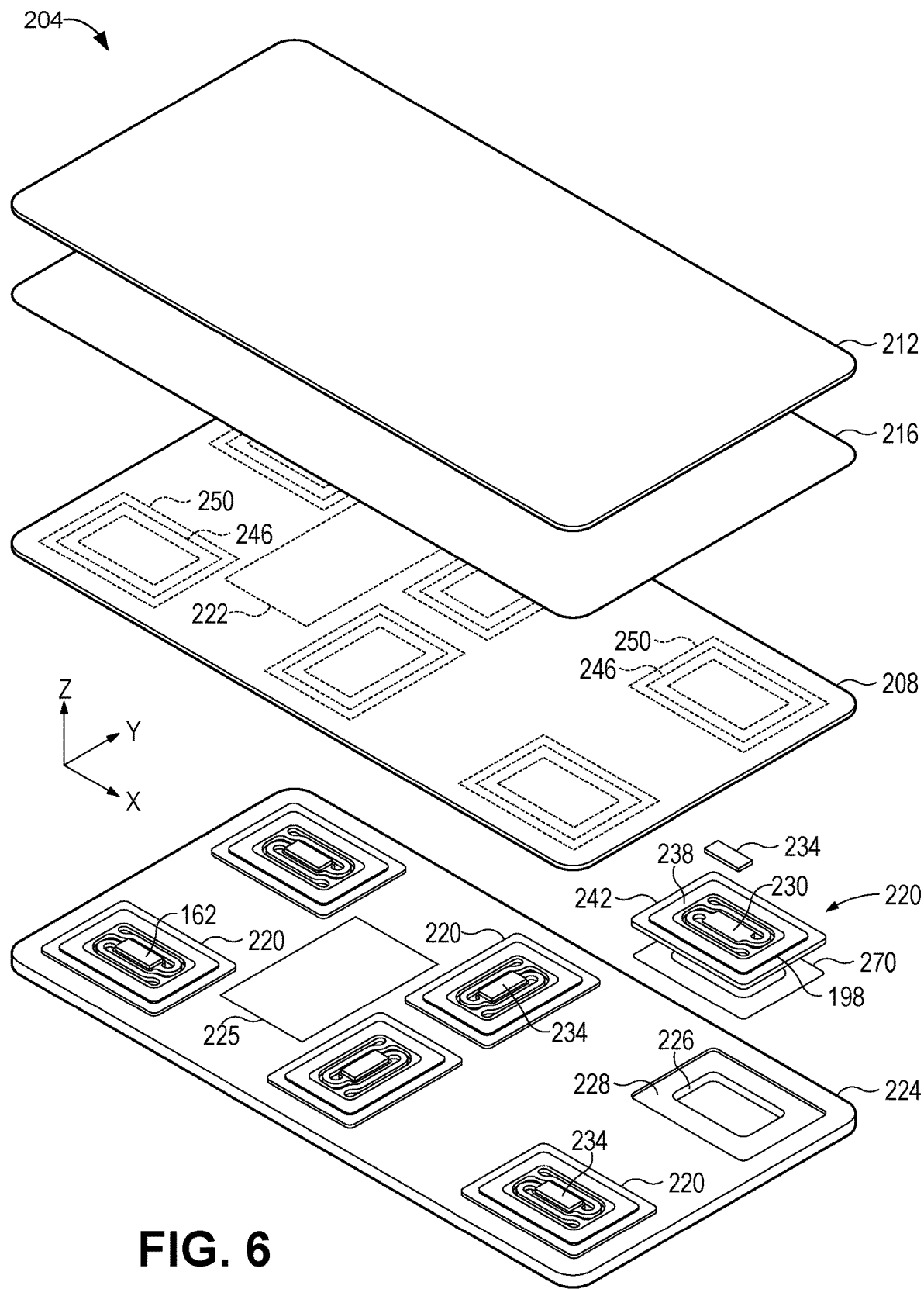
FIG. 6 shows a partial exploded view of the trackpad in the keyboard of FIG. 5.
Figure 7:
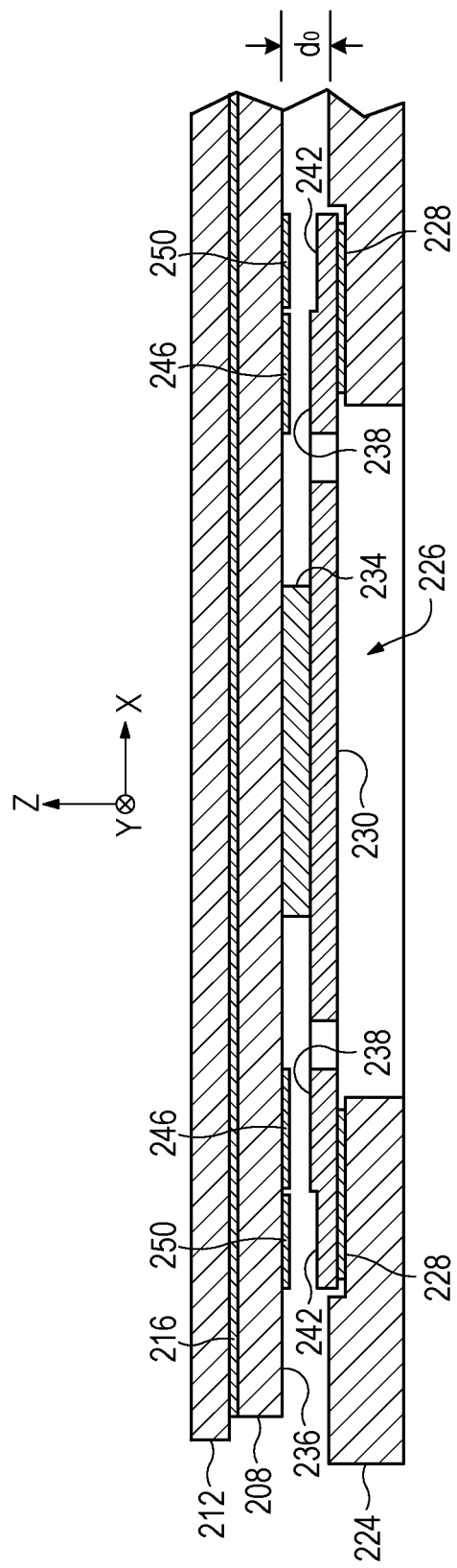
FIG. 7 shows a partial cross-section view of the trackpad of FIG. 5 taken along line 7-7 in FIG. 5.

In some examples, the bending detection algorithms 136 are configured to determine that a keyboard is bending at least by using data from PCB electrodes and base electrodes to detect a gap change between the PCB and the base plate. With reference now to FIGS. 5-7, components of another example trackpad 204 that utilizes differential capacitive sensing to determine a base height do between the PCB and the base plate are illustrated. Trackpad 204 can be utilized with keyboard 100 described above or any other suitable keyboard. In this example and with reference to FIG. 6, trackpad 204 includes a PCB 208 affixed to a cover glass layer 212 by an adhesive layer 216. PCB 208 is supported by a plurality of springs 220 located on a base plate 224. In this example, trackpad 204 utilizes six springs 220 to support the PCB 208 and provide keyboard bending detection and force determinations as described further below. In other examples, trackpads of the present disclosure can utilize fewer or more springs. Additionally and as illustrated in FIG. 6, a haptic actuator 222 is coupled to PCB 208 and a corresponding magnet 225 is located on the base plate 224.

With reference to the simplified cross section illustrated in FIG. 7, each spring 220 comprises a central portion 230 that is resiliently supported by two beams extending from opposing internal walls of the spring. A spacer 234 is located between the central portion 230 and a lower metal layer 236 of PCB 208. In some examples, spacer 234 comprises a silicone bump that includes an embedded conductive bead that provides grounding of the spring 220 to facilitate capacitive measurements.

With reference to FIG. 6, the base plate 224 defines six apertures 226 that each correspond to one of the springs 220. As shown in FIGS. 6 and 7, at each aperture 226 the base plate 224 comprises a recessed shelf 228 that surrounds the aperture. A spring 220 is affixed to each recessed shelf 228 of the base plate 224. A central portion 230 of the spring 220 is positioned over a corresponding aperture 226 in the base plate 224. In this manner, each spring 220 resiliently supports PCB 208 in a manner that enables the PCB to move in the z-axis direction in response to a force exerted on the cover glass layer 212.

With reference also to the simplified cross section of FIG. 7, in the present example each spring 220 comprises an inner rectangular spring electrode 238 and an outer rectangular spring electrode 242 surrounding and concentric with the inner rectangular spring electrode. With reference to FIG. 6, in this example the inner rectangular spring electrode 238 and the outer rectangular spring electrode 242 are affixed to the recessed shelf 228 of the base plate 224 via adhesive layer 270. PCB 208 includes corresponding PCB electrodes that are each spaced from and overlying one of the spring electrodes of a spring 220. In the present example the PCB electrodes comprise an inner rectangular PCB electrode 246 and an outer rectangular PCB electrode 250 surrounding and concentric with the inner rectangular PCB electrode.

Accordingly and as shown in FIG. 7, the inner rectangular PCB electrode 246 is spaced from and overlies the inner spring electrode 238, and the outer rectangular PCB electrode 250 is spaced from and overlies the outer spring electrode 242.

As shown in FIGS. 6 and 7, in this example the outer spring electrode 242 of each spring 220 is stepped down in the z-axis direction with respect to the inner spring electrode 238. In this manner and as illustrated in FIG. 7, a first distance between the inner spring electrode 238 and the inner PCB electrode 246 is less than a second distance between the outer spring electrode 242 and the outer PCB electrode 250. It follows that the capacitance between the inner spring electrode 238 and the inner PCB electrode 246 is also different from the outer spring electrode 242 and the outer PCB electrode 250.

This differential capacitance between the two pairs of electrodes at each spring 220 can be used to determine changes in the base height do at each spring and corresponding bending of the keyboard. With this configuration, the bending detection algorithms 136 can determine that the keyboard is bending at least by using data from the electrodes to detect a gap change in the base height do between the PCB 208 and the base plate 224. Additionally, this configuration is also utilized to provide force sensing using differential capacitive force sensing techniques. For example, a linear estimation of the force at the inner PCB electrode 246 and the outer PCB electrode 250 can be determined as follows:

$$F_{\_linear\_estimation} = \frac{K}{\varepsilon A_{pad}} d_0^2 dC(F)$$

where K is the spring constant of the spring 220, dC(F) is the change in capacitance at the electrode, do is the distance between the electrode and the opposing spring electrode, F the force applied by the user on the trackpad, $A_{pad}$ is the area of the electrode, and ε is the permittivity of the medium in the gap between the electrode and the base plate 164.

As described above, the touch force algorithms 142 can use this data from the electrodes to adjust a spring constant value to an adjusted spring constant value, and use the adjusted spring constant value to determine a force applied to the touch receiving surface that compensates for the detected keyboard bending. Further and as noted above, in the present examples where the force-sensing trackpad 104 comprises a haptic actuator coupled to the touch receiving surface, the touch force algorithms 142 can determine that the force applied to the touch receiving surface exceeds a force-to-fire threshold. Based at least partially on determining that the force exceeds the force-to-fire threshold, the haptic actuation algorithms 140 can cause the haptic actuator to generate haptic output via the touch receiving surface, thereby signaling to the user that their input is received.

Additionally and in another potential advantage of this configuration, in some examples the touch force algorithms 142 can separately adjust multiple spring constant values associated with different locations on the touch receiving surface, and can use these multiple adjusted spring constant values to determine force magnitudes at these different locations. In some examples, bending detection algorithms 136 can detect a first gap change between the PCB and the base plate at a first location of the touch receiving surface, and detect a second gap change different than the first gap change between the PCB and the base plate at a second location.

For example, a first gap change at one of the springs 220 in the middle of the base plate 224 and a second gap change at one of the springs 220 on either end of the base plate can be utilized to determine that the keyboard is bending. In this example, the first gap change is utilized to determine a first adjusted spring constant value associated with the first location. This first adjusted spring constant value is then used to determine a first force applied at the first location on the touch receiving surface. The second gap change is utilized to determine a second adjusted spring constant value associated with the second location. This second adjusted spring constant value is then used to determine a second force applied at the second location on the touch receiving surface.

In some examples, such as the bending behavior illustrated in FIG. 4, the first gap change in the middle of the base plate 224 is a decrease in distance between the PCB 208 and the base plate from a neutral gap, such as the gap do shown in FIG. 7, and the second gap change at one end of the base plate is an increase in distance between the PCB 208 and the base plate. Advantageously, by detecting multiple different gap changes and the corresponding different changes in capacitance at different locations of the trackpad 204, more precise estimates of keyboard bending behavior can be determined and utilized to provide adjusted spring constant values across a range of bending scenarios.

It will be appreciated that in other examples, keyboards and trackpads of the present disclosure can utilize other configurations of springs and spring electrodes including any suitable number of springs and corresponding apertures in a base plate, as well as different configurations of spring electrodes and corresponding PCB electrodes.

In some examples, keyboards of the present disclosure can utilize a force-sensing trackpad that includes one or more bending sensors comprising a sensing device mounted to the base plate or the chassis. In one example and with reference to FIG. 8, keyboard 100 includes strain gauge 180 that measures the deflection or deformation of the base plate 164. Using at least data from the strain gauge 180, the bending detection algorithms 136 can determine that the keyboard is bending. At least on condition of determining that the keyboard is bending, the touch force algorithms 142 can adjust a spring constant value to an adjusted spring constant value and use the adjusted spring constant value to determine a force applied to the touch receiving surface.

In one potential advantage of this configuration, a measurement of the actual, mechanical bending/deflection of the base plate 164 can be determined and utilized to select an adjusted spring constant value, such as from a corresponding look up table. Additionally and in some examples, mounting the strain gauge 180 or other sensing device to the base plate or chassis can provide accurate bending measurements over time because the mechanical strength of the base plate and/or chassis can maintain the sensing device in a substantially fixed position. In other examples, two or more strain gauges can be affixed to the base plate 164 and utilized to adjust a haptic driving signal as discussed above. In other examples, a variety of other sensing devices that measure deflection/deformation of the base plate 164 can be utilized.

In other examples, one or more sensing devices can be mounted to other portion(s) of a keyboard to detect and measure bending of the keyboard. In one example and with reference to FIG. 9, keyboard 100 includes a first strain gauge 182 that measures the deflection or deformation of the keyboard chassis 114 at a first location, and a second strain gauge 184 that measures the deflection/deformation of the keyboard chassis 114 at a second location on an opposing end of the chassis. Using at least data from these strain gauges, the bending detection algorithms 136 can determine that the keyboard is bending, and data from these strain gauges can be used to adjust an initial spring constant value(s) to an adjusted spring constant value(s) to compensate for the effects of such bending.

In one potential advantage of this configuration, separate measurements of actual, mechanical bending/deflection of the chassis 114 at opposing ends of the chassis can be determined and utilized to determine a more precise estimation of the force applied to the touch receiving surface. In other examples, a variety of other sensing devices that measure deformation of the chassis 114 can be utilized.

In some examples, the bending detection algorithms 136 and touch force algorithms can operate to adjust one or more spring constant values at least in response to determining that a user is touching the touch receiving surface of the trackpad. For example, touch detection algorithms 132 can determine that a user is touching the touch receiving surface of the trackpad. At least on condition of determining that the user is touching the touch receiving surface and determining that the keyboard is bending as described above, data from the bending sensor is used to adjust an initial spring constant value to an adjusted spring constant value. In one potential advantage of this configuration, by utilizing a touch detection to trigger a bending determination, adjustments of the spring constant value can be performed in real time and in close temporal proximity to a touch event that may trigger haptic feedback.

In some examples, the bending detection algorithms 136 and haptic actuation algorithms 140 can operate to pre-determine an adjusted spring constant value prior to a user touch event on the touch receiving surface of the trackpad. For example, touch detection algorithms 132 can determine that a user is not touching the touch receiving surface of the trackpad. At least on condition of determining that the user is not touching the touch receiving surface, data from the bending sensor is used to adjust an initial spring constant value to a pre-determined adjusted spring constant value.

Next, touch detection algorithms 132 determine that a user is touching the touch receiving surface. At least on condition of determining that a user is touching the touch receiving surface and the keyboard is bending, the touch force algorithms 142 use the pre-determined adjusted spring constant value to determine a force applied to the touch receiving surface. In one potential advantage of this configuration and in some use cases, by using data from the bending sensor to pre-determine an adjusted spring constant value prior to a user touching the trackpad, the pre-determined adjusted spring constant value can be promptly utilized by the touch force algorithms to determine a force applied to the touch receiving surface when a touch event is detected, thereby providing faster and more consistent force determinations and corresponding haptic output to a user when appropriate.

Figure 10A:
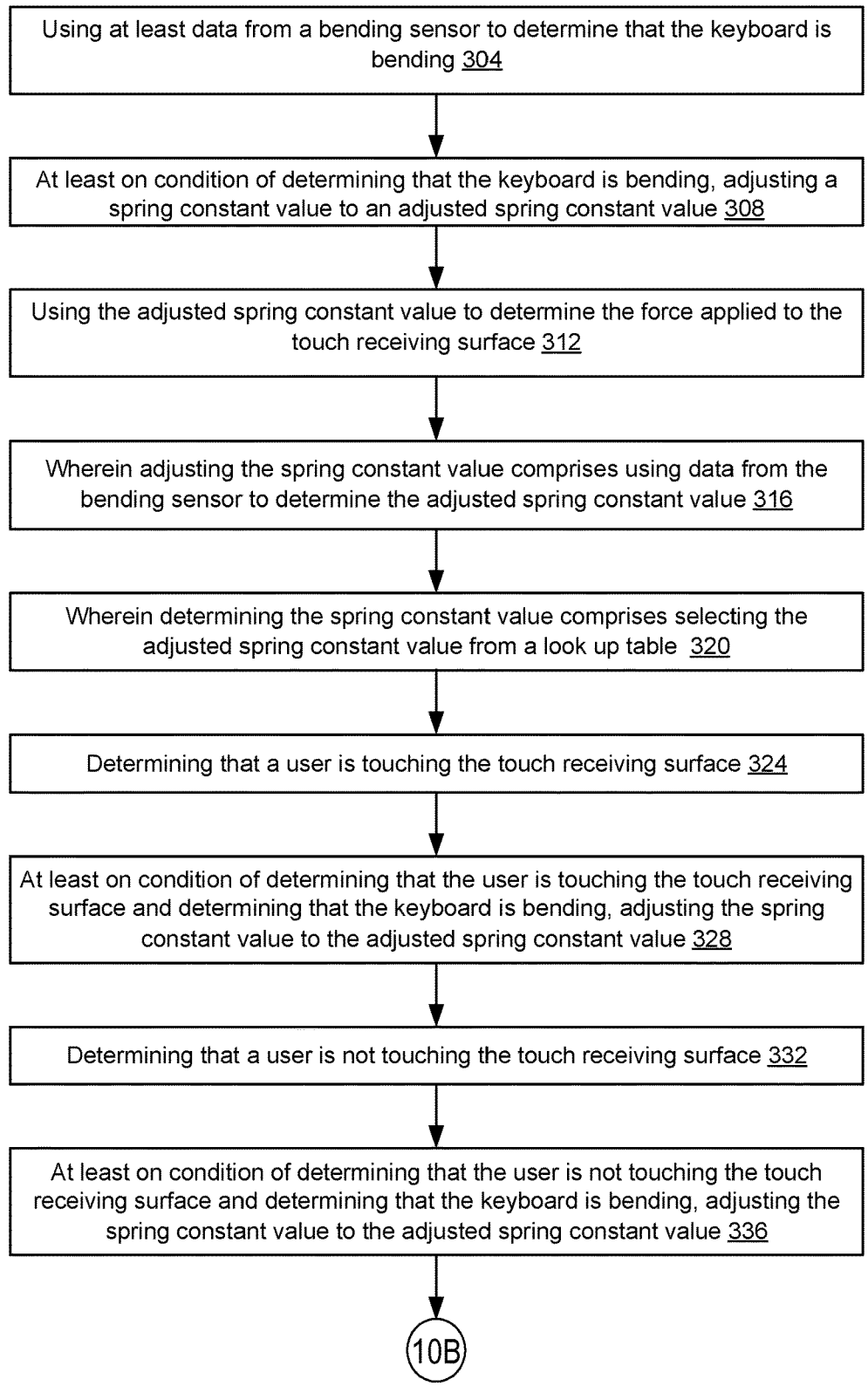

With reference now to FIGS. 10A and 10B, a flow diagram is provided depicting an example method 300 for determining a force applied to a touch receiving surface of a force-sensing trackpad in a keyboard according to examples of the present disclosure. The following description of method 300 is provided with reference to the keyboard 100, trackpads 104, 204 and other components described herein and shown in FIGS. 1-9 and 11. In other examples, the method 300 is performed with other configurations of keyboards and in other contexts using other suitable devices and components.

At 304 and with reference to FIG. 10A, method 300 includes using at least data from a bending sensor to determine that the keyboard is bending. At 308 method 300 includes, at least on condition of determining that the keyboard is bending, adjusting a spring constant value to an adjusted spring constant value. At 312 method 300 includes using the adjusted spring constant value to determine the force applied to the touch receiving surface. At 316 method 300 includes wherein adjusting the spring constant value comprises using data from the bending sensor to determine the adjusted spring constant value.

At 320 method 300 includes wherein determining the spring constant value comprises selecting the adjusted spring constant value from a look up table. At 324 method 300 includes determining that a user is touching the touch receiving surface. At 328 method 300 includes, at least on condition of determining that the user is touching the touch receiving surface and determining that the keyboard is bending, adjusting the spring constant value to the adjusted spring constant value. At 332 method 300 includes determining that the user is not touching the touch receiving surface. At 336 method 300 includes, at least on condition of determining that the user is not touching the touch receiving surface and determining that the keyboard is bending, adjusting the spring constant value to the adjusted spring constant value.

With reference now to FIG. 10B, at 340 method 300 includes, wherein the spring constant value is a first spring constant value associated with a first location on the touch receiving surface, the adjusted spring constant value is a first adjusted spring constant value, and the force is a first force applied at the first location on the touch receiving surface, at least on condition of determining that the keyboard is bending, adjusting a second spring constant value associated with a second location on the touch receiving surface to a second adjusted spring constant value. At 344 method 300 includes using the second adjusted spring constant value to determine a second force applied at the second location on the touch receiving surface.

At 348 method 300 includes wherein the PCB comprises a plurality of PCB electrodes, the base plate comprises a plurality of base electrodes, and the bending sensor comprises the PCB electrodes and the base electrodes. At 352 method 300 includes determining that the keyboard is bending at least by detecting capacitance changes between the PCB electrodes and the base electrodes. At 356 method 300 includes, wherein the force-sensing trackpad comprises a haptic actuator coupled to the touch receiving surface, determining that the force exceeds a force-to-fire threshold. At 360 method 300 includes, based at least on determining that the force exceeds the force-to-fire threshold, causing the haptic actuator to generate haptic output via the touch receiving surface.

Figure 11:
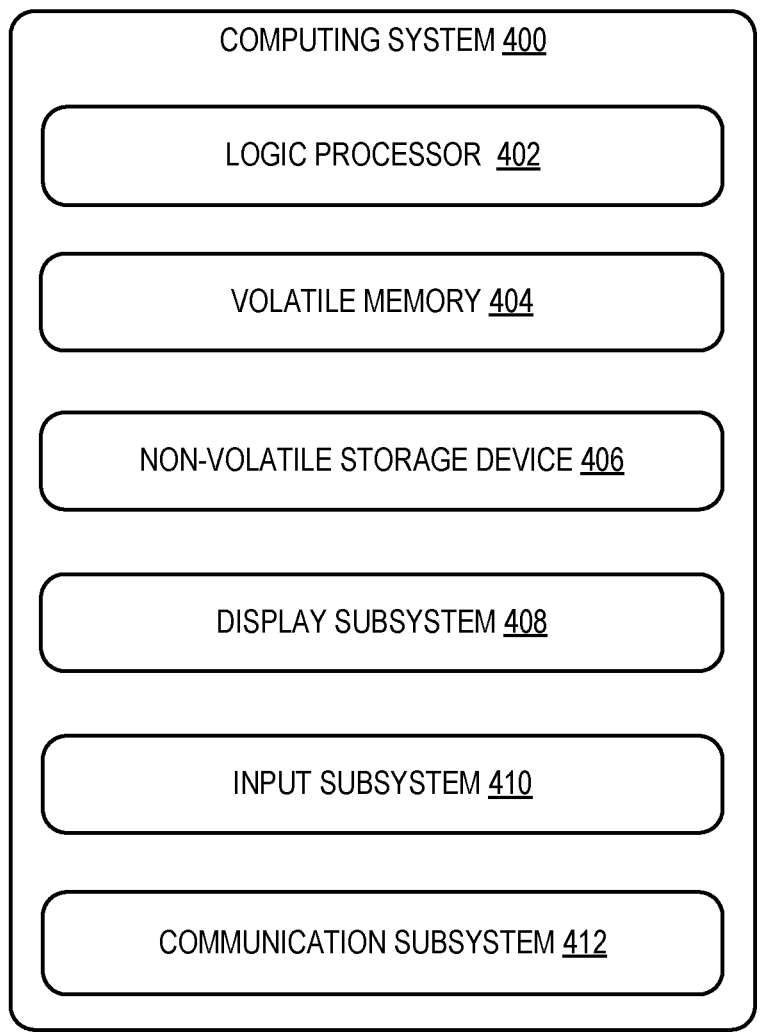
FIG. 11 shows a block diagram of an example computing system according to examples of the present disclosure.

In some embodiments, the keyboards, trackpads, and components described herein may include and/or be utilized with a computing system embodying different computing aspects and comprising one or more computing devices. FIG. 11 schematically shows a simplified representation of a computing system 400 configured to provide any to all of the compute functionality described herein. Computing system 400 is shown in simplified form. The keyboard 100, trackpads 104, 204 and computing device 106 described above may comprise computing system 400 or one or more aspects of computing system 400.

Computing system 400 includes a logic processor 402, volatile memory 404, and a non-volatile storage device 406. Computing system 400 may optionally include a display subsystem 408, input subsystem 410, communication subsystem 412, and/or other components not shown in FIG. 11.

Logic processor 402 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 404 may include physical devices that include random access memory (RAM). Volatile memory 404 is typically utilized by logic processor 402 to temporarily store information during processing of software instructions. It will be appreciated that volatile memory 404 typically does not continue to store instructions when power is cut to the volatile memory 404.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 408 may be used to present a visual representation of data held by non-volatile storage device 406. As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

Input subsystem 410 may comprise or interface with one or more user-input devices such as trackpad 104, touch screen display 110, a mouse, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as an HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides a keyboard, comprising: a force-sensing trackpad comprising: a touch receiving surface; and a printed circuit board (PCB) coupled to the touch receiving surface; a base plate spaced from the PCB; a plurality of resilient members coupling the base plate to the PCB; a bending sensor configured to detect bending of the keyboard; a processor; and a memory storing instructions executable by the processor to: use at least data from the bending sensor to determine that the keyboard is bending; at least on condition of determining that the keyboard is bending, adjust a spring constant value to an adjusted spring constant value; and use the adjusted spring constant value to determine a force applied to the touch receiving surface. The keyboard may additionally or alternatively include, wherein adjusting the spring constant value comprises using data from the bending sensor to determine the adjusted spring constant value. The keyboard may additionally or alternatively include, wherein determining the adjusted spring constant value comprises selecting the adjusted spring constant value from a look up table. The keyboard may additionally or alternatively include, wherein the instructions are executable to: determine that a user is touching the touch receiving surface; and at least on condition of determining that the user is touching the touch receiving surface and determining that the keyboard is bending, adjust the spring constant value to the adjusted spring constant value. The keyboard may additionally or alternatively include, wherein the instructions are executable to: determine that a user is not touching the touch receiving surface; and at least on condition of determining that the user is not touching the touch receiving surface and determining that the keyboard is bending, adjust the spring constant value to the adjusted spring constant value. The keyboard may additionally or alternatively include, wherein the spring constant value is a first spring constant value associated with a first location on the touch receiving surface, the adjusted spring constant value is a first adjusted spring constant value, and the force is a first force applied at the first location on the touch receiving surface, and the instructions are executable to: at least on condition of determining that the keyboard is bending, adjust a second spring constant value associated with a second location on the touch receiving surface to a second adjusted spring constant value; and use the second adjusted spring constant value to determine a second force applied at the second location on the touch receiving surface. The keyboard may additionally or alternatively include, wherein the PCB comprises a plurality of PCB electrodes, the base plate comprises a plurality of base electrodes, and the bending sensor comprises the PCB electrodes and the base electrodes. The keyboard may additionally or alternatively include, wherein the instructions are executable to determine that the keyboard is bending at least by detecting capacitance changes between the PCB electrodes and the base electrodes. The keyboard may additionally or alternatively include, wherein the keyboard comprises a chassis, the base plate is affixed to the chassis, and the bending sensor comprises a sensing device mounted to the base plate or the chassis. The keyboard may additionally or alternatively include, wherein the force-sensing trackpad comprises a haptic actuator coupled to the touch receiving surface, and the instructions are executable to: determine that the force exceeds a force-to-fire threshold; and based at least partially on determining that the force exceeds the force-to-fire threshold, cause the haptic actuator to generate haptic output via the touch receiving surface.

Another aspect provides a method for determining a force applied to a touch receiving surface of a force-sensing trackpad in a keyboard, the method comprising: using at least data from a bending sensor to determine that the keyboard is bending; at least on condition of determining that the keyboard is bending, adjusting a spring constant value to an adjusted spring constant value; and using the adjusted spring constant value to determine the force applied to the touch receiving surface. The method may additionally or alternatively include, wherein adjusting the spring constant value comprises using data from the bending sensor to determine the adjusted spring constant value. The method may additionally or alternatively include, wherein determining the spring constant value comprises selecting the adjusted spring constant value from a look up table. The method may additionally or alternatively include determining that a user is touching the touch receiving surface; and at least on condition of determining that the user is touching the touch receiving surface and determining that the keyboard is bending, adjusting the spring constant value to the adjusted spring constant value. The method may additionally or alternatively include determining that the user is not touching the touch receiving surface; and at least on condition of determining that the user is not touching the touch receiving surface and determining that the keyboard is bending, adjusting the spring constant value to the adjusted spring constant value. The method may additionally or alternatively include, wherein the spring constant value is a first spring constant value associated with a first location on the touch receiving surface, the adjusted spring constant value is a first adjusted spring constant value, and the force is a first force applied at the first location on the touch receiving surface, the method further comprising: at least on condition of determining that the keyboard is bending, adjusting a second spring constant value associated with a second location on the touch receiving surface to a second adjusted spring constant value; and using the second adjusted spring constant value to determine a second force applied at the second location on the touch receiving surface. The method may additionally or alternatively include, wherein the PCB comprises a plurality of PCB electrodes, the base plate comprises a plurality of base electrodes, and the bending sensor comprises the PCB electrodes and the base electrodes. The method may additionally or alternatively include determining that the keyboard is bending at least by detecting capacitance changes between the PCB electrodes and the base electrodes. The method may additionally or alternatively include, wherein the force-sensing trackpad comprises a haptic actuator coupled to the touch receiving surface, the method further comprising: determining that the force exceeds a force-to-fire threshold; and based at least on determining that the force exceeds the force-to-fire threshold, causing the haptic actuator to generate haptic output via the touch receiving surface.

Another aspect provides a keyboard, comprising: a force-sensing haptic trackpad comprising: a touch receiving surface; a haptic actuator coupled to the touch receiving surface; and a printed circuit board (PCB) coupled to the touch receiving surface and comprising a plurality of PCB electrodes; a base plate spaced from the PCB and comprising a plurality of base electrodes; a plurality of resilient members coupling the base plate to the PCB; a processor; and a memory storing instructions executable by the processor to: use at least capacitance change data from the plurality of PCB electrodes and the plurality of base electrodes to determine that the keyboard is bending; at least on condition of determining that the keyboard is bending, use at least the capacitance change data to determine an adjusted spring constant value; use the adjusted spring constant value to determine a force applied to the touch receiving surface; determine that the force exceeds a force-to-fire threshold; and based at least on determining that the force exceeds the force-to-fire threshold, cause the haptic actuator to generate haptic output via the touch receiving surface.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A keyboard, comprising:
   a force-sensing trackpad comprising:
      a touch receiving surface; and
      a printed circuit board (PCB) coupled to the touch receiving surface;
   a base plate spaced from the PCB;
   a plurality of resilient members coupling the base plate to the PCB;
   a bending sensor configured to detect bending of the keyboard;
   a processor; and
   a memory storing instructions executable by the processor to:
      use at least data from the bending sensor to determine that the keyboard is bending;
      at least on condition of determining that the keyboard is bending, adjust a spring constant value to an adjusted spring constant value; and
      use the adjusted spring constant value to determine a force applied to the touch receiving surface.

2. The keyboard of claim 1, wherein adjusting the spring constant value comprises using data from the bending sensor to determine the adjusted spring constant value.

3. The keyboard of claim 2, wherein determining the adjusted spring constant value comprises selecting the adjusted spring constant value from a look up table.

4. The keyboard of claim 1, wherein the instructions are executable to:
   determine that a user is touching the touch receiving surface; and
   at least on condition of determining that the user is touching the touch receiving surface and determining that the keyboard is bending, adjust the spring constant value to the adjusted spring constant value.

5. The keyboard of claim 1, wherein the instructions are executable to:
   determine that a user is not touching the touch receiving surface; and
   at least on condition of determining that the user is not touching the touch receiving surface and determining that the keyboard is bending, adjust the spring constant value to the adjusted spring constant value.

6. The keyboard of claim 1, wherein the spring constant value is a first spring constant value associated with a first location on the touch receiving surface, the adjusted spring constant value is a first adjusted spring constant value, and the force is a first force applied at the first location on the touch receiving surface, and the instructions are executable to:
   at least on condition of determining that the keyboard is bending, adjust a second spring constant value associated with a second location on the touch receiving surface to a second adjusted spring constant value; and
   use the second adjusted spring constant value to determine a second force applied at the second location on the touch receiving surface.

7. The keyboard of claim 1, wherein the PCB comprises a plurality of PCB electrodes, the base plate comprises a plurality of base electrodes, and the bending sensor comprises the PCB electrodes and the base electrodes.

8. The keyboard of claim 7, wherein the instructions are executable to determine that the keyboard is bending at least by detecting capacitance changes between the PCB electrodes and the base electrodes.

9. The keyboard of claim 1, wherein the keyboard comprises a chassis, the base plate is affixed to the chassis, and the bending sensor comprises a sensing device mounted to the base plate or the chassis.

10. The keyboard of claim 1, wherein the force-sensing trackpad comprises a haptic actuator coupled to the touch receiving surface, and the instructions are executable to:
determine that the force exceeds a force-to-fire threshold; and
based at least partially on determining that the force exceeds the force-to-fire threshold, cause the haptic actuator to generate haptic output via the touch receiving surface.

11. A method for determining a force applied to a touch receiving surface of a force-sensing trackpad in a keyboard, the method comprising:
using at least data from a bending sensor to determine that the keyboard is bending;
at least on condition of determining that the keyboard is bending, adjusting a spring constant value to an adjusted spring constant value; and
using the adjusted spring constant value to determine the force applied to the touch receiving surface.

12. The method of claim 11, wherein adjusting the spring constant value comprises using data from the bending sensor to determine the adjusted spring constant value.

13. The method of claim 12, wherein determining the spring constant value comprises selecting the adjusted spring constant value from a look up table.

14. The method of claim 11, further comprising:
determining that a user is touching the touch receiving surface; and
at least on condition of determining that the user is touching the touch receiving surface and determining that the keyboard is bending, adjusting the spring constant value to the adjusted spring constant value.

15. The method of claim 11, further comprising:
determining that the user is not touching the touch receiving surface; and
at least on condition of determining that the user is not touching the touch receiving surface and determining that the keyboard is bending, adjusting the spring constant value to the adjusted spring constant value.

16. The method of claim 11, wherein the spring constant value is a first spring constant value associated with a first location on the touch receiving surface, the adjusted spring constant value is a first adjusted spring constant value, and the force is a first force applied at the first location on the touch receiving surface, the method further comprising:
at least on condition of determining that the keyboard is bending, adjusting a second spring constant value associated with a second location on the touch receiving surface to a second adjusted spring constant value; and
using the second adjusted spring constant value to determine a second force applied at the second location on the touch receiving surface.

17. The method of claim 11, wherein the PCB comprises a plurality of PCB electrodes, the base plate comprises a plurality of base electrodes, and the bending sensor comprises the PCB electrodes and the base electrodes.

18. The method of claim 17, further comprising determining that the keyboard is bending at least by detecting capacitance changes between the PCB electrodes and the base electrodes.

19. The method of claim 11, wherein the force-sensing trackpad comprises a haptic actuator coupled to the touch receiving surface, the method further comprising:
determining that the force exceeds a force-to-fire threshold; and
based at least on determining that the force exceeds the force-to-fire threshold, causing the haptic actuator to generate haptic output via the touch receiving surface.

20. A keyboard, comprising:
a force-sensing haptic trackpad comprising:
a touch receiving surface;
a haptic actuator coupled to the touch receiving surface; and
a printed circuit board (PCB) coupled to the touch receiving surface and comprising a plurality of PCB electrodes;
a base plate spaced from the PCB and comprising a plurality of base electrodes;
a plurality of resilient members coupling the base plate to the PCB;
a processor; and
a memory storing instructions executable by the processor to:
use at least capacitance change data from the plurality of PCB electrodes and the plurality of base electrodes to determine that the keyboard is bending;
at least on condition of determining that the keyboard is bending, use at least the capacitance change data to determine an adjusted spring constant value;
use the adjusted spring constant value to determine a force applied to the touch receiving surface;
determine that the force exceeds a force-to-fire threshold; and
based at least on determining that the force exceeds the force-to-fire threshold, cause the haptic actuator to generate haptic output via the touch receiving surface.

* * * * *